United States Patent [19]

Kubota et al.

[11] Patent Number: 4,658,942

[45] Date of Patent: Apr. 21, 1987

[54] LIQUID PRESSURE OPERATED BRAKING SYSTEM

[75] Inventors: Hitoshi Kubota, Minami-ashigara; Keiji Nakagawa, Yokosuka, both of Japan

[73] Assignees: Nissan Motor Co., Ltd., Yokohama; Nippon Air Brake Co., Ltd., Kobe, both of Japan

[21] Appl. No.: 599,803

[22] Filed: Apr. 13, 1984

[30] Foreign Application Priority Data

Apr. 25, 1983 [JP] Japan ................................ 58-71401

[51] Int. Cl.$^4$ ............................................ B60K 41/24
[52] U.S. Cl. ................................. 192/13 A; 137/598
[58] Field of Search ............. 192/3 H, 13 A; 137/598

[56] References Cited

U.S. PATENT DOCUMENTS

| 2,131,944 | 10/1938 | Freeman | 192/13 A |
| 2,223,717 | 12/1940 | Coffman | 192/13 A |
| 4,247,154 | 1/1981 | Shoji et al. | 192/13 A |

FOREIGN PATENT DOCUMENTS

| 55-21250 | 2/1980 | Japan. | |
| 58-4636 | 1/1983 | Japan. | |
| 58-4654 | 1/1983 | Japan. | |
| 105867 | 6/1983 | Japan | 192/13 A |
| 2102518 | 2/1983 | United Kingdom. | |

Primary Examiner—Rodney H. Bonck
Assistant Examiner—Richard M. Lorence
Attorney, Agent, or Firm—Schwartz, Jeffery, Schwaab, Mack, Blumenthal & Evans

[57] ABSTRACT

A liquid pressure operated braking system comprises a valve assembly with a first valve operatively coupled to a clutch pedal for confining the liquid pressure applied to the associated group of wheel cylinders when the clutch pedal is depressed and a second valve. The second valve includes a stepped piston having a large pressure acting area and a small pressure acting area and an elastomeric valve body adapted to close a valve bore when the stepped piston assumes a predetermined position. The valve body defining a third pressure acting area when the second valve is closed which is exposed to the liqiud pressure in the valve bore. The valve bore is connected to the associated source of liquid pressure, i.e., a tandem master cylinder.

4 Claims, 4 Drawing Figures

LIQUID PRESSURE OPERATED BRAKING SYSTEM

BACKGROUND OF THE INVENTION

The present invention relates to a liquid pressure operated braking system for an automotive vehicle.

Starting a vehicle from a standstill on an up-hill road is regarded as one of the difficult driving techniques. For beginners it is very difficult to release a parking brake in good timed relation with the engagement of a clutch upon starting the vehicle on the up-hill road. If the release of the parking brake is delayed as compared to the engagement of the clutch, the engine stalls while if the release of the parking brake is too early, the automotive vehicle rolls down the road in the reverse direction, resulting in a collision with the following vehicle.

To deal with this problem, a liquid pressure operated braking system has been proposed which keeps on applying wheel brakes of a vehicle so as to allow the vehicle to stay still on the up-hill road without the use of the parking brake even if the brake pedal is released as long as the clutch pedal is kept depressed after the vehicle has come to a halt on the up-hill road wherein the brake pedal and the clutch pedal are depressed. With this liquid pressure operated braking system, when a driver wishes to start the vehicle on the up-hill road, what he/she has to do is to put the transmission into the starting gear and then slowly release the clutch pedal just like releasing the clutch pedal in starting the vehicle on the flat road. This causes a gradual reduction in braking force as the clutch engagement progresses, allowing the vehicle to move off from a standstill on the up-hill road without using the parking brake, thus making it easy even for a beginner to start the vehicle on the up-hill road.

SUMMARY OF THE INVENTION

According to the present invention, a liquid pressure operated braking system for a vehicle having a clutch actuated by a clutch pedal via a clutch operating mechanism, comprises:

at least two sub-systems, each sub-system being for the transmission of liquid pressure from a respective one of two sources of liquid pressure to a respective one of two groups of brake operating wheel cylinders;

a valve assembly including a first valve fluidly disposed in one of the sub-systems and operatively coupled to the clutch operating mechanism for confining the liquid pressure applied to the associated one group of brake operating wheel cylinders to the one sub-system upon clutch disengagement when the vehicle is at a standstill on an up-hill road;

the valve assembly also including a second valve fluidly disposed in the other sub-system, the second valve including a housing having a first port connected to the associated source of liquid pressure to the other sub-system, a second port connected to the associated one group of brake operating wheel cylinders to the other sub-system and a valve bore communicating with said first port, the second valve also including a stepped piston, movably disposed in said housing, having a large pressure acting area exposed to liquid pressure acting in the associated one group of brake operating wheel cylinders to the one sub-system and a small pressure acting area exposed to liquid pressure acting in the associated one group of brake operating wheel cylinders to the other sub-system, said stepped piston being movable to a predetermined valve close position wherein said stepped piston closes said valve bore to prevent at least fluid flow communication from said second port to said first port.

DETAILED DESCRIPTION OF THE INVENTION

Figure 1:
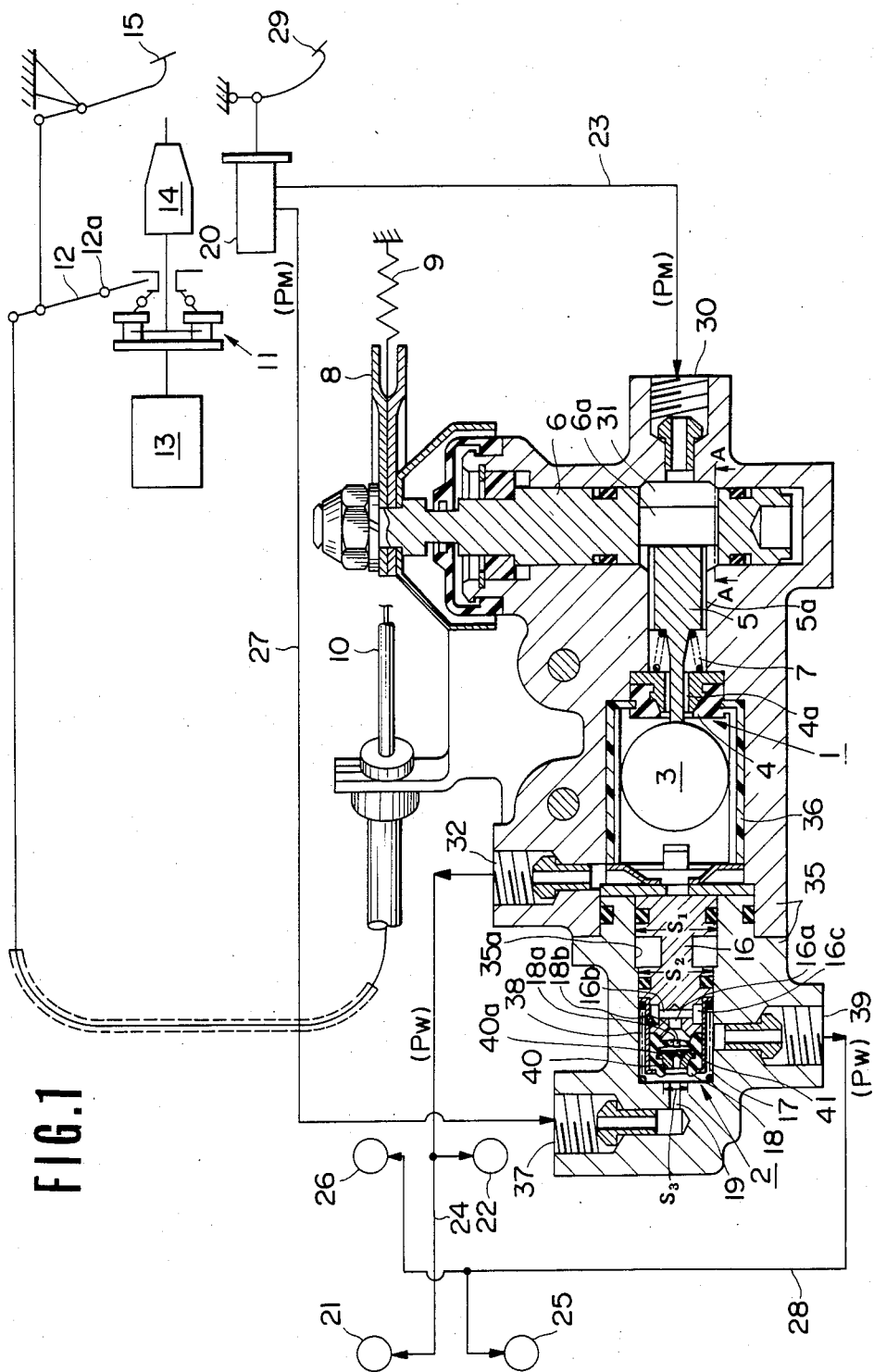
FIG. 1 is a schematic diagram of a liquid pressure operated braking system according to the present invention.

Referring to the drawings, the liquid pressure operated braking system according to the present invention is described.

Referring to FIG. 1, the liquid pressure operated braking system comprises a valve assembly having a first valve 1 and a second valve 2 which are mounted in a valve housing 35.

Figure 2:
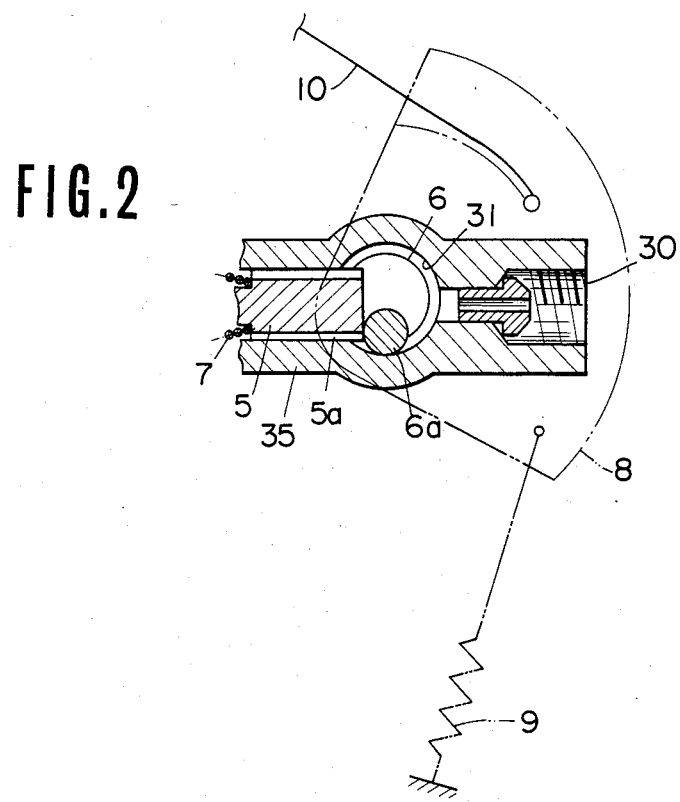
FIG. 2 is a sectional view through A—A in FIG. 1.

The first valve 1 comprises a ball 3 movably retained in a ball cage 36, a valve seat 4 which seats the ball 3, a push rod 5 extending through the valve seat 4, a cam shaft 6 with an eccentric cam 6a, and a spring 7. The cam shaft 6 is rotatably supported by the valve housing 35 and has its one end projected outwardly. Fixedly connected to the projected end of the cam shaft 6 is a lever 8 (see FIG. 2 also) which is linked via a cable 10 to a withdrawal lever 12 of a clutch 11. The clutch 11, when it is engaged, establishes a power delivery path from an engine 13 to a transmission 14, while when a clutch pedal 15 is depressed, the withdrawal lever 12 is rotated clockwise around a shaft 12a, disengaging the clutch 11, thus interrupting the power delivery path. The lever 8 is biased by a spring 9 to rotate in a direction to pull the cable 10. That is, when the clutch pedal 15 is released to engage the clutch 11, the cam shaft 6 assumes the position wherein the eccentric cam 6a is in the angular position as illustrated in FIG. 2 where the push rod 5 is projected against the spring 7 through the valve bore 4a as shown in FIG. 1, thus maintaining the first valve 1 open. When the clutch pedal 15 is depressed to interrupt the clutch 11, the cam shaft 6 rotates counterclockwise as viewed in FIGS. 2 and 3 through about 90 degrees from the angular position shown in FIG. 2 to the angular position shown in FIG. 3, allowing the spring 7 to bias to retract the push rod 5 deeply into the valve bore 4a, thus permitting the ball 3 of the first valve 1 to move by its inertia to seat on the valve seat 4.

The second valve 2 comprises a stepped piston 16 having a large diameter end portion forming a large pressure acting area (S1) and a small diameter end portion forming a small pressure acting area (S2), a spring 17, an elastomeric valve body 18 made of rubber, and a valve bore 19. The valve housing 35 includes a stepped bore 35a receiving therein the stepped piston 16, an inlet port 37 connected to the associated source of liquid pressure in the master cylinder 20 and opening to the stepped bore 35a via the valve bore 19, and an outlet port 39 connected to the associated group of wheel cylinders 25, 26 and opening to the stepped bore 35a. The stepped piston 16 defines a chamber 38 within the stepped bore 35a on the side of the small diameter end portion. To the chamber 38, the outlet port 39 is always open.

The elastomeric valve body 18, mounted fixedly to the small diameter end of the stepped piston 16, has a central opening securely receiving therein a valve seat 40 formed with passages 40a. On the side of the valve seat 40 near the stepped piston 16, the passages 40a are closed by an elastomeric lip portion 18a of the valve body 18 and an opening 18b is formed through the center of the lip portion. Formed through the stepped piston 16 is a passage, consisting of an axial bore 16a and a diametrical bore 16b, communicating with the opening 18b, and also formed through the stepped piston 16 is a circumferential groove 16c which allows a fluid communication of the opening 18b with the chamber 38. Engaged with this circumferential groove 16c is a valve body retainer 41 that is used to mount the valve body 18 to the stepped piston 16. The lip portion 18a is adapted to sealably contact with the valve seat 40 to close the passages 40a, thus preventing the liquid flow into the passages 40a from the opening 18b of the lip portion 18a, but the lip portion 18a deforms to permit the liquid flow from the passages 40a toward the opening 18b. Therefore, the valve body 18 serves as a one-way valve with its lip portion 18a cooperating with the valve seat 40.

The first valve 1 is fluidly disposed in one of the sub-systems by coupling its inlet port 30 and its outlet port 32 to the pipes 23 and 24, respectively, while the second valve 2 is fluidly disposed in the other sub-system by coupling its inlet port 37 and its outlet port 39 to the pipes 27 and 28, respectively.

The operation of the liquid pressure operated braking system is described.

When the brake pedal 29 is depressed for the purpose of bringing the vehicle to a halt on the up-hill road, the master cylinder liquid pressure PM produced by the tandem master cylinder 20 is transmitted through the pipe 23, annular space 31, longitudinal gutters 5a of the push rod 5, valve bore 4a of the valve seat 4, outlet port 32 and pipe 24, to the wheel cylinders 21, 22 as wheel cylinder liquid pressure PW, while the other master cylinder pressure PM is supplied from the pipe 27 to the wheel cylinders 25, 26 as wheel cylinder liquid pressure PW via the inlet port 37, the second valve 2 as in its closed state, the outlet port 39 and the pipe 28.

Referring to the second valve 2, inasmuch as the pressure acting area S1 formed on the large diameter end portion of the stepped piston 16 is greater than the pressure acting area S2 formed on the small diameter end portion thereof, the stepped piston 16 moves against the spring 17 from the illustrated position shown in FIG. 1 to a position wherein the valve body 18 closes the valve bore 19 although the liquid pressures of the same magnitude act on these pressure acting areas S1 and S2, respectively. Thus, the second valve 2 is closed when the master cylinder pressure PM increases above a predetermined value. After closure of the second valve 2, the liquid flows through the passages 40a, the opening 18b of the lip portion 18a, the bores 16a, 16b, the circumferential groove 16c and the chamber 38 to the outlet port 39, thus allowing the transmission of the liquid pressure to the wheel cylinders 25, 26 via the pipe 28 even after the second valve 2 is closed.

Therefore, all of the wheel cylinders 21, 22 and 25, 26 are actuated as the brake pedal 29 is depressed.

Figure 3:
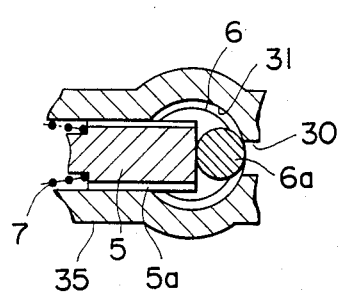
FIG. 3 is a similar view to FIG. 2 showing an angular position assumed by a cam shaft when the clutch is disengaged.
Figure 4:
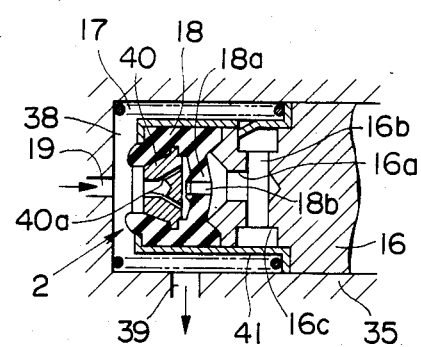
FIG. 4 is an enlarged fragmentary view of FIG. 1 showing a one-way valve arrangement of a second valve.

When the vehicle is about to come to a halt on the up-hill road, if, with the brake pedal 29 kept depressed, the clutch pedal 15 is depressed so as to disengage the clutch 11, the withdrawal lever 12 rotates clockwise as viewed in FIG. 1, pulling the cable 10, rotating the lever 8 against the spring 9, thus rotating the cam shaft 6 from the position illustrated in FIG. 1 or FIG. 2 to the angular position illustrated in FIG. 3 where the first valve 1 is closed by itself because the ball 3 moves down the inclined ball cage 36, due to its weight, toward the valve seat 4 to seat thereon. Thus, even if the production of the master cylinder liquid pressure PM is suspended as a result of releasing the brake pedal 29, the wheel cylinder liquid pressure PW is maintained, thus keeping all of the wheel cylinders 21, 22 and 25, 26 actuated. Explaining more specifically how the wheel cylinder liquid pressure PW is maintained, the wheel cylinder liquid pressure PW in the pipe 24 is maintained due to the function of the first valve 1 to confine the liquid pressure applied to the wheel cylinders 21, 22 in a manner to prevent the reverse flow but allowing the liquid flow from the master cylinder side to the wheel cylinders 21, 22, thus keeping the wheel cylinders 21, 22 actuated. On the other hand, the wheel cylinder liquid pressure PW in the pipe 28 is not allowed to drain toward the pipe 27 because this wheel cylinder liquid pressure biases the lip portion 18a against the valve seat 40, closing the passages 40a, thus keeping the wheel cylinders 25, 26 actuated. For the reason described above, as long as the clutch pedal 15 is depressed, the vehicle is kept at a halt on the up-hill road even if the brake pedal 29 is released.

Subsequently, for starting the vehicle on the up-hill road, the clutch pedal 15 is gradually released to engage the clutch 11 after the transmission 13 is put into the starting gear, the cam shaft 6 in cooperation with the clutch engagement rotates from the angular position illustrated in FIG. 3 to the angular position as illustrated in FIG. 2, causing the eccentric cam 6a to move the push rod 5 to the left as viewed in FIG. 1, disengaging the ball 3 away from the valve seat 4 at a gradual rate, thus gradually opening the first valve 1. This causes the liquid in the pipe 24 to be discharged gradually via the first valve 1, causing a gradual reduction in the wheel cylinder liquid pressure PW in the pipe 24, thereby gradually decreasing the braking force by the wheel cylinders 21, 22. Since, when the second valve 2 is closed, i.e, when the stepped piston 16 assumes a predetermined valve close position, the wheel cylinder liquid pressure PW in the pipe 28 connected to the wheel cylinders 25, 26 acts on the stepped piston 16 in cooperation with the spring 17 against the wheel cylinder pressure PW in the pipe 24, the stepped piston 16 moves gradually to the right as viewed in FIG. 1 in response to a reduction in the wheel cylinder liquid pressure PW in the pipe 24. This rightward movement of the stepped piston 16 causes the second valve 2 to open gradually, allowing the liquid in the pipe 28 to be discharged gradually, causing a gradual reduction in the wheel cylinder liquid pressure PW in the pipe 28, thereby gradually decreasing the braking force by the wheel cylinders 25, 26. In this manner, it is now made possible for even the beginner to start the vehicle on the up-hill road only by releasing the clutch pedal 15 in the usual manner without relying on the parking brake.

Normal braking operation when the vehicle travels on a flat road is substantially the same as the braking operation on the up-hill road as described above except that the ball 3 stays disengaged from the valve seat 4 even after the push rod 5 is retracted into the valve bore 4a of the valve seat 4 due to the depression of the clutch pedal 15. This is because the ball cage 36 is not inclined for the ball 3 to move down toward the valve seat 4.

On the flat road, releasing the brake pedal 29 allows the wheel cylinder liquid pressure PW in the pipe 24 to decrease as the master cylinder liquid pressure PM in the pipe 23 decreases irrespective of whether the clutch pedal 15 is depressed or not (released) because the ball 3 stays disengaged from the valve seat 4 as long as the vehicle travels on the flat road. When the brake pedal 29 is released, the master cylinder liquid pressure PM in the pipe 27 decreases. The stepped piston 16 moves immediately to the right as viewed in FIG. 1 to the illustrated position in FIG. 1 owing to the imbalance, between the wheel cylinder liquid pressure PW in the pipe 24 and the wheel cylinder liquid pressure PW confined in the pipe 28, caused by the reduction in the wheel cylinder liquid pressure in the pipe 24. As a result, the second valve 2 opens immediately after the reduction in the wheel cylinder liquid pressure PW in the pipe 24, thus allowing the wheel cylinder liquid pressure PW in the pipe 28 to begin to decrease without any substantial delay after the reduction in the master cylinder liquid pressure PM in the pipe 27.

As will be appreciated from the above, when the vehicle is on the flat road, the wheel cylinder liquid pressure PW in the pipe 24 and that in the pipe 28 are not confined even if the brake pedal 29 is released with clutch pedal 15 kept depressed. Since the stepped piston 16 moves immediately to open the second valve 2, there occurs no appreciable difference between the rate of reduction in the wheel cylinder liquid pressure PW in the pipe 28 and the rate of reduction in the master cylinder liquid pressure PM in the pipe 27.

The equilibrium state between forces applied to the stepped piston 16 when the second valve 2 is closed, is expressed by the following equation, where the pressure acting area on the large diameter end portion of the stepped piston 16 is S1, the pressure acting area on the small diameter end portion of the stepped piston 16 is S2, the sealing area of the valve body 18 is S3 (i.e., this third pressure acting area S3 being created when the second valve 2 is closed), the spring force of the spring 17 is F, and the sliding friction of the stepped piston 16 is f:

$$PMS3 + (S2-S3)PW + F - f = PMS1 \qquad (1).$$

The pressure difference $\Delta P$ created across the second valve 2, when it is closed, as the depressing effort on the brake pedal 29 is decreased can be expressed by the equation $PW = PM + \Delta P$. Inserting this equation into the above mentioned equation to delete PW will give the pressure difference $\Delta P$ by;

$$\Delta P = \frac{S1 - S2}{S2 - S3} PM + \frac{f - F}{S2 - S3} \qquad (2)$$

As is apparent from this equation (2), the pressure difference $\Delta P$ can be made extremely small if the sealed pressure acting area S3 is made small as compared to the pressure acting area S2, so that there occurs no imbalance between the braking efforts which is created owing to this pressure difference $\Delta P$ as the braking by the wheel cylinders is to be released. Besides, since the pressure difference $\Delta P$ can be made small, a difference (a difference in pressure drop) between the pressure PW in the pipe 24 and the pressure PW in the pipe 28 can be made small. As a result, a difference between braking effort by the wheel cylinders 21,22 and the braking effort by the wheel cylinders 25,26 can be made small accordingly.

As is appreciated from the above, with the liquid pressure operated braking system according to the present invention, inasmuch as the source of liquid pressure (in the illustrated embodiment, the outlet port of the master cylinder 20 connected to the pipe 27) is connected to the valve bore 19, the pressure acting area S3 has been made small as compared to the pressure acting area S2, thus making the pressure difference $\Delta P$ small enough to a value not to pose the problem actually. Practically, the pressure acting area S3 should be smaller than half the pressure acting area S2 ($S3 < \frac{1}{2}S2$). Further, it will be appreciated that the pressure acting area S3 can be made to a desired small value without any difficulty.

We claim:

1. A liquid pressure operated braking system for a vehicle having a clutch actuated by a clutch pedal via a clutch operating mechanism, comprising:

at least two sub-systems, each sub-system being for the transmission of liquid pressure from a respective one of two sources of liquid pressure to a respective one of two groups of brake operating wheel cylinders;

a valve assembly including a first valve fluidly disposed in one of the sub-systems and operatively coupled to the clutch operating mechanism for confining the liquid pressure applied to the associated one group of brake operating wheel cylinders to the one sub-system upon clutch disengagement when the vehicle is at a standstill on an up-hill road;

the valve assembly also including a second valve fluidly disposed in the other sub-system, the second valve including a housing having a first port connected to the associated source of liquid pressure to the other sub-system, a second port connected to the associated one group of brake operating wheel cylinders to the other sub-system and a valve bore constantly communicating with said first port, the second valve also including a stepped piston, movably disposed in said housing, having a large pressure acting area exposed to liquid pressure acting in the associated one group of brake operating wheel cylinders to the one sub-system and a small pressure acting area exposed to liquid pressure acting in the associated one group of brake operating wheel cylinders to the other sub-system, said stepped piston being movable to a predetermined valve close position wherein said stepped piston closes said valve bore to prevent at least fluid flow communication from said second port to said first port.

2. A liquid pressure operated braking system as claimed in claim 1, wherein the stepped piston has a large diameter end portion forming the large pressure acting area, and a small diameter end portion forming the small pressure acting area, and wherein the second valve also includes an elastomeric valve body mounted on the small diameter end portion of the stepped piston, the elastomeric valve body closing the valve bore when the stepped piston assumes the predetermined valve position and defining a third pressure acting area exposed to the liquid pressure of the associated source of liquid pressure to the other sub-system.

3. A liquid pressure operated braking system as claimed in claim 2, wherein said third pressure acting area is smaller than half the small pressure acting area.

4. A liquid pressure operated braking system as claimed in claim 3, wherein the second valve includes one-way valve means operative when the stepped piston assumes the predetermined close position for preventing liquid flow from the second port toward the first port.

* * * * *